United States Patent [19]
Linard

[11] 4,041,321
[45] * Aug. 9, 1977

[54] MEASURING APPARATUS

[76] Inventor: Robert Housú Linard, 12, bis Rue de Serre, 54000 Nancy, France

[*] Notice: The portion of the term of this patent subsequent to Jan. 11, 1994, has been disclaimed.

[21] Appl. No.: 713,592

[22] Filed: Aug. 11, 1976

Related U.S. Application Data

[63] Continuation-in-part of Ser. No. 594,234, July 9, 1975.

[30] Foreign Application Priority Data

Nov. 4, 1974 France .............................. 74.40629

[51] Int. Cl.$^2$ ........................................... G01N 21/30
[52] U.S. Cl. ................................... 250/560; 250/227; 250/233
[58] Field of Search ................... 250/211 K, 560, 561, 250/232, 233, 236, 227; 178/7.6

[56] References Cited

U.S. PATENT DOCUMENTS

| | | | |
|---|---|---|---|
| 1,945,968 | 2/1934 | De Amicis | 178/6.8 |
| 3,358,150 | 12/1967 | Summer | 250/211 K |
| 3,619,626 | 11/1971 | Rudolf | 250/561 |
| 3,727,067 | 4/1973 | Shepherd | 250/560 |
| 3,806,730 | 4/1974 | Tirkkonen et al. | 250/227 |

Primary Examiner—David C. Nelms
Attorney, Agent, or Firm—Robert E. Burns; Emmanuel J. Lobato; Bruce L. Adams

[57] ABSTRACT

Apparatus for measuring the length of an elongate product, such as a rolled steel bar or shape. The product is inserted between a light source and a light receiver, and thereby throws a shadow on the light receiver. The receiver comprises an outer, stationary cylinder which has a longitudinal slit, and an inner rotatable cylinder which has a helicoidal or triangular or similar slit. The outer and inner slits jointly define a window of changeable form or position. Through this window, incident light from the source, free of the product's shadow, falls on a light conducting rod or system, thereby controlling a photo-sensitive system which provides a measurement of the exact end of the shadow's position, and thereby of the length of the product.

10 Claims, 9 Drawing Figures

MEASURING APPARATUS

CROSS REFERENCE TO PRIOR APPLICATION

This is a continuation-in-part of the application Ser. No. 594,234 filed on July 9, 1975.

BACKGROUND OF THE INVENTION

This invention relates to an apparatus for precisely measuring the length of an elongate product such as a rolled steel rod or shape or another elongate metal product.

It is known to position or to move such a product in front of a measuring apparatus, for example on a roller conveyor. The measuring apparatus has heretofore been of complicated structure or has given measurements of poor accuracy, or has had both types of drawbacks. The known devices include a fixed cell apparatus, which requires the product to be displaced at a uniform speed, and on optical circular sweeping apparatus, which brings about an error in trigonometrical angle measurements, this error increasing with the speed of displacement of the product. It has also been proposed to use optical fiber apparatus, having photosensitive elements at regular intervals; this type of apparatus has been expensive owing to the number of detection components required in connection with its data processing system; moreover, the length error has been of the order of an entire interval between two photosensitive elements. Purely mechanical devices have also been known to have been of very limited operating speed.

An object of the invention is to provide an improved apparatus, free of the drawbacks of the existing types of apparatus.

SUMMARY OF THE INVENTION

The apparatus uses a photosensitive detection unit which is capable of dividing the length of the product into small submultiple lengths, the measurement of which provides high precision in the ultimate measurement of the entire length. There is formed a luminous spot or line linearly movable or changeable in length along the elongate product, by rotation of a constituent member relative to stationary member. These members are of cylindrical form and have cooperating slits. One of them has a slit extending parallel to the cylinder axis which is parallel to the product to be measured; the other member rotates coaxially thereto. An inner rod or unit of rods is provided which is illuminated through a window formed by the cooperating slits and which conducts luminous flux, introduced through this window, to photosensitive elements for the control of a suitable numerical volt meter circuit.

The total cost of the new apparatus is considerably lower than that of the earlier apparatus for making the same measurements. At the same time the accuracy and general quality of the measurements obtained by the new apparatus are exceptional, and they remain uniform up to speeds which are considered high for conveying rolled products. The apparatus is simple to manufacture and is reliable in use.

DESCRIPTION OF PREFERRED EMBODIMENTS

Figure 1:
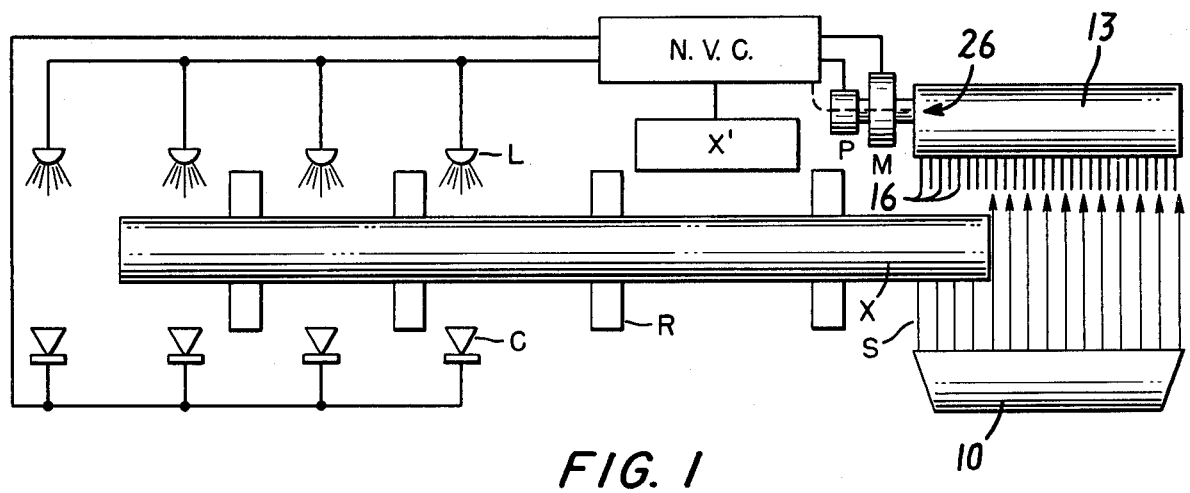
FIG. 1 is a plan view of apparatus according to the invention.
Figure 2:
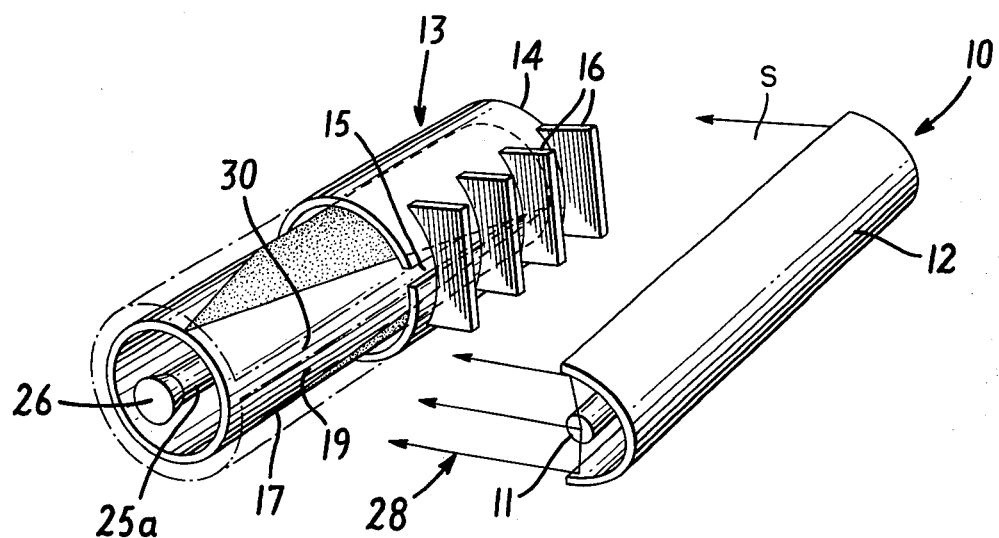
FIG. 2 is a perspective view of an important portion of the apparatus.

As shown in FIGS. 1 and 2, the apparatus comprises an elongate light-emitting assembly 10 and a parallel elongate light-receiving assembly 12 spaced therefrom to provide therebetween a space S wherein a rolled product X is disposed, resting or moving on a support such as a roller conveyor R.

The light-emitter 10 can be formed by a lamp or tube 11 disposed on the focus line of a reflector 12 of parabolic profile so that a beam of parallel rays 28 is formed.

The illustrated receiver 13 comprises a fixed cylinder 14 having an open longitudinal slit or aperture 15 for reception of the light beam 28. At the level of slit 15, the surface of cylinder 14 advantageously has a series of mutually parallel light guides, plates or baffles 16 normal to the cylinder for directing the incident light 28 to prevent parasitic oblique rays from entering slit 15 which would adversely effect the measurements.

Figures 3, 4:
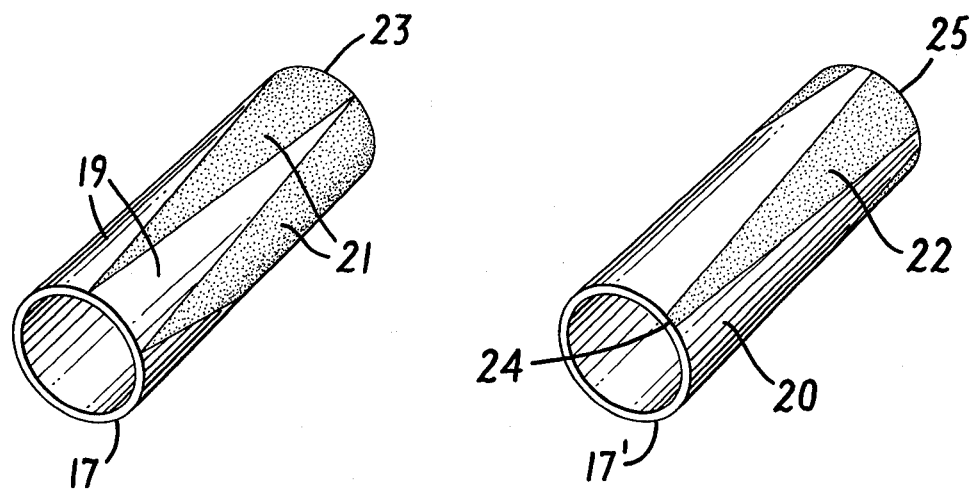
FIG. 3 is a perspective view of an element from FIG. 2.
FIG. 4 is a similar view of a modified element.

Coaxially within cylinder 14 there is provided a rotatable cylinder 17 which has a triangular or trapezoidal slit, 19 or 20, FIGS. 3 and 4 respectively, and extending from one to the other end of this cylinder. These slits alternate with opaque zones 21 and 22 respectively, also shown as having triangular and trapezoidal shape. The basis 23 of the triangles as well as the short and long basis 24 and 25 of the trapeziums is dimensioned so that the number of slits and opaque zones is even and integral on the cylinder. This cylinder 17 is rotated by a motor M (FIG. 1; so also in FIGS. 4,5, where different cylinders 17', 17" are shown).

Figures 8, 9:
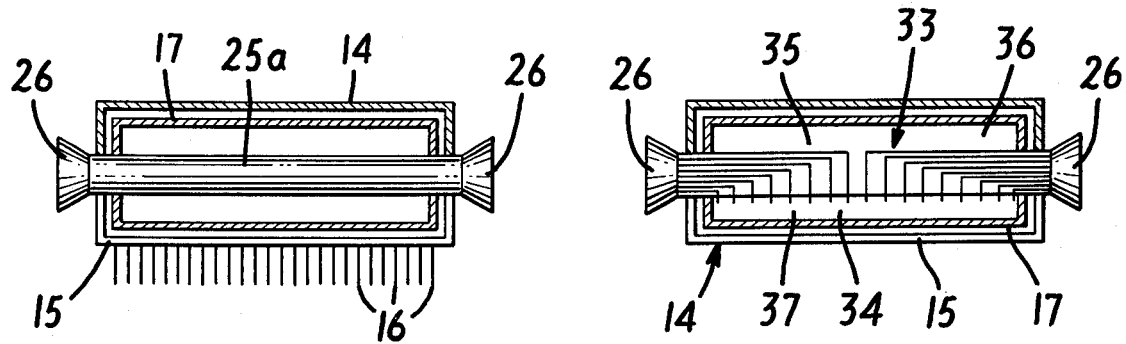
FIG. 8 is a longitudinal cross-sectional view of the apparatus of FIG. 5.
FIG. 9 is a longitudinal cross-sectional view of another modified apparatus.

Coaxially within the rotating cylinder 17 there is provided a fixed rod 25a (FIGS. 2,8), having at each end thereof, adjacent the opposite ends of receiver 13, a photosensitive element 26. This rod desirably has an outer layer which is internally light reflective, but is otherwise and particularly opposite the light receiving slit 15, made of light transmissive material as is known to the art. The rod can also have a ground rear portion opposite slit 15, formed and disposed so that a maximum of the incident light is applied toward the ends of the rod and photosensitive elements 26. The sensitive surfaces of these elements face the ends of the rod. The light-receiving rod 25a can also advantageously be paralleled by reflector 27 of parabolic profile (FIG. 6) to concentrate the incident parallel rays 28 on the body of the rod.

The interplay of the stationary slit 15 and of the rotating slits 19 or 20 causes the repetitive and cyclic formation of a resulting window 30 elongated along the cylinders and linearly growing in length from one end to the other of receiving rod 25a during one phase of each cycle. Depending on the shape and arrangement of triangular slits 19 or trapezium slits 20, this window either can or cannot shrink in length during a following phase of each cycle.

Figure 5:
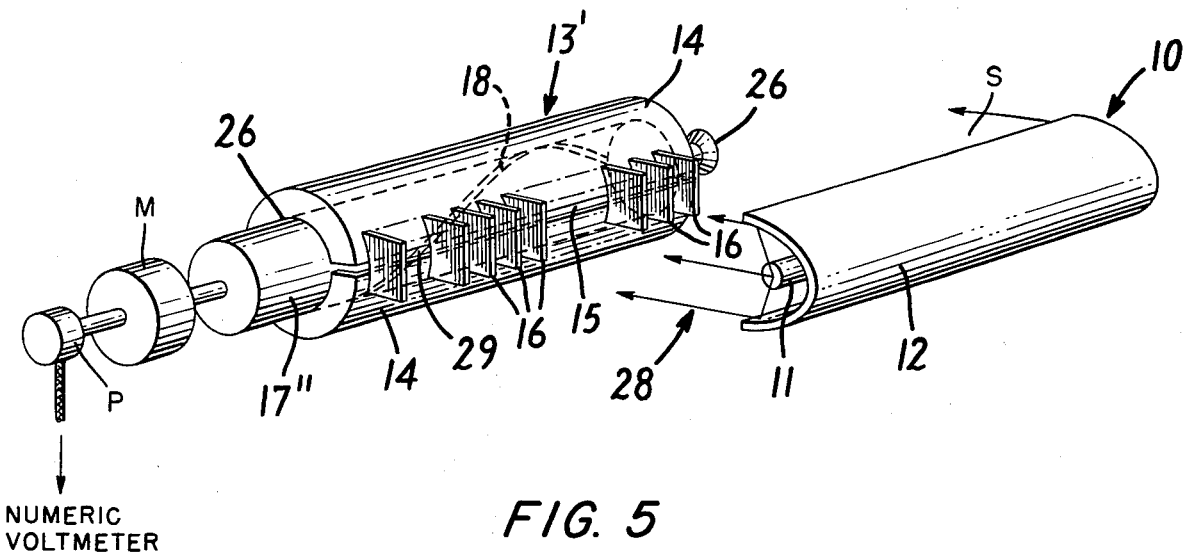
FIG. 5 is a perspective view of a modification of FIG. 2.

In the modified apparatus of FIG. 5 the receiver 13' has an inner rotatable cylinder 17" which has a helicoidal slit 18. This slit has a pitch or inclination relative to the cylindrical axis. For example, it can be arranged so as indicated in FIG. 5, as to provide a single whose wave extending from one to the other end of cylinder 17". Obviously, although not shown, it is also possible to provide a helicoidal slit forming a plurality of whole waves so extending.

Figures 6, 7:
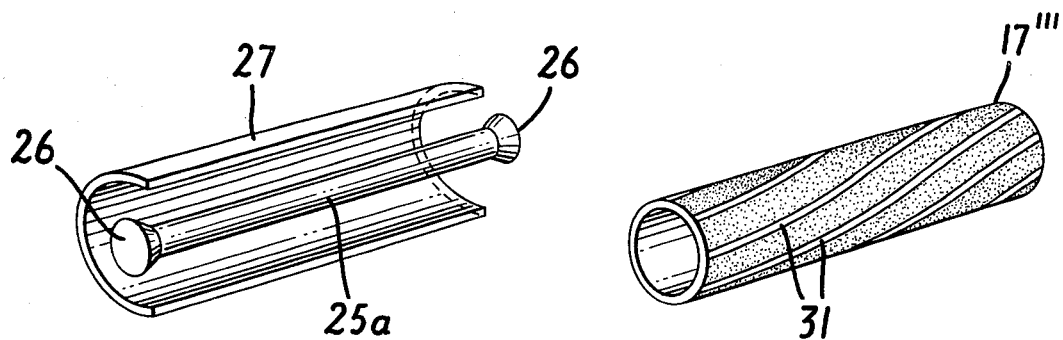
FIG. 6 is a perspective view of elements for the embodiment of FIG. 5.
FIG. 7 is a similar view of a modified element.

In order to allow the use of relatively low speed of rotation of a moving cylinder 17''', particularly when the speed of displacement of the products to be measured is high, the cylinder can have a plurality of coincident helicoidal slits 31 extending along one another (FIG. 7). It is possible to make the cylinder of a transparent or translucent material and to cover its inner or outer face or both with an opaque layer or lining, in which the helix or helices are cut out.

According to another modification (FIG. 9) the receiving light conductor rod 25a is replaced by a generally cylindrical bundle 33 of parallel light-conducting fibers 35, 36, shown as arranged in two half bundles symmetrical to one another along the receiver. Each fiber comprises a thin rod arranged parallel to the cylindrical axis and has, facing the stationary slit 15, a transverse fiber element 37 providing a light pick-up point 34 and arranged at regular intervals along the cylinder. The fibers which at each moment in operation receive light can be counted by suitable electronic modulation of the photoelectric impulses provided by cells 26.

As shown in FIG. 1, these impulses are received in numeric volt meter circuit NVC which also receives more basic measuring impulses from photosensitive cells C excited by light from lamps L to provide basic or coarse measurements of length data from product X which is positioned or moved between L and C. When a first light ray from L reaches a first cell C such as the one at left in FIG. 1, a measuring or counting stop circuit in circuit NBC is inactivated and motor M is started thereby. This motor then rotates cylinder 17 to provide window 30 by cooperation of slits 15, 19, this window extending in length from the left end of the receiver at the approximate travelling speed if any of product X. By a part of the circuit NVC the operating speed of motor M can be regulated in accordance with the travelling speed of product X. If the length of product X is measured while the product is at rest, the motor comes to rest when the length of the light beam incident on the receiver corresponds in a predetermined way to the length of the product. In this condition, the length of the product interposed between light source 10 and light receiver 13 provides a shadow in the light beam incident on the latter. When the right end of window 30 reaches the right end of the shadow, it stops the counting process. Correspondingly, the rotation of the cylinder is a function of the length of the product which is added to the distance between a cell C at left and receiver 13 at right.

Assuming next that product X moves at a relatively slow speed, cylinder 17 can be rotated for example at 3000 rpm; desirably a cylinder 17' according to FIG. 7 is used. When the left end of product X has exposed the first cell C the measurements can be obtained rapidly during the time in which the right hand front end of the product progresses in front of receiver 13. The passage of each slit 31 provides a measurement and these can be averaged to obtain suitable precision.

According to FIG. 5 the product, although not shown in that figure, also move from left to right in front of receiver 13'. Cells C, as in FIG. 1, provide approximate premeasurement of a length dimension so that the order of magnitude of the length to be measured is known at once. Of course the distances between cells C are suitably correlated with the length of receiver 13; they can, for example, be equal to this length. When the front end of product X throws a shadow on the receiver motor M is started at once and window 29 begins to move, along with the product, the motor being synchronized with the speed of the product electronically. The synchronization is effected when the partial illumination of cell 26 has reached a certain magnitude that is when window 29 has slightly moved relative to the front end of the shadow. Only the last cell C, not activated at the start of the motor remains in service; when the end of the product passes this last cell, the cell is excited and the resulting voltage provides a suitable activation of potentiometer P coupled with motor M. This activation is converted into millimeters and is displayed.

Travelling speeds of product X up to about 4 meters per second can be measured, with accuracy, in this way, the accuracy being sufficient to distinguish 1/10th of one millimeter regardless of the total length of the product (in contrast to former devices which only approximately measure a length accurate to a centimeter). The measurements are easily convertable into the weight of the product.

What is claimed is:

1. A device for measuring a length of an object, such as a rolled metal product, comprising;
   a light emitter unit;
   a light receiver unit for receiving light emited by the emitter unit, subject to imposition of a shadow on the emitted light by an object interposed between the units, the length of which object is to be measured, a length of the shadow corresponding to the length of the object and one of the units having a rotary, apertured cylindrical member and a fixed, apertured, cylindrical member having a common axis with the rotary member;
   means connected with the unit having said members for rotating the rotary member to cooperate with the fixed member in providing a linearly changeable aperture for the emitted light with the shadow imposed on it to be received in the light receiver unit;
   a light guiding device in the light receiver unit and extending along the common axis of said members; and
   photosensitive means disposed in the light receiver unit for exposure thereof, through the light guiding device, to the received light to sense the length of the shadow and thereby to measure the length of the object.

2. A device according to claim 1 in which the rotary and fixed, apertured, cylindrical members are parts of the light receiver unit.

3. A device according to claim 2 in which the rotary member is apertured by an opening defined by edges extending along the light guiding member, the edges including an edge oblique to said axis, the fixed member being apertured by an opening defined by edges parallel to the axis so that upon the rotation of the rotary member said aperture becomes cyclically changeable in length along the light guiding member.

4. A device according to claim 3 in which the opening of the rotary member is generally triangular.

5. A device according to claim 3 in which the opening of the rotary member is generally trapezoidal.

6. A device according to claim 2 in which the rotary member is apertured by a helicoidal opening, the fixed member being apertured by an opening defined by edges parallel to said axis, so that on rotation of the rotary member said aperture moves along the axis.

7. A device according to claim 6 in which the rotary member has at least one additional helicoidal opening, the helicoidal openings having helicoidal turns equally spaced apart along the axis.

8. A device according to claim 2 in which the fixed member surrounds the rotary member, the fixed member having light baffle members secured to the outside thereof to direct the light, emitted by the emitter unit, in directions normal to the light guiding member and thereby to prevent any oblique light rays from entering into the light receiver unit.

9. A device according to claim 2 in which the light guiding device is a light-transmissive, internally light-reflective rod disposed axially of the light receiver unit, and the photosensitive means comprises a cell mounted on an end of the rod, for said exposure through the rod.

10. A device according to claim 2 in which the light guiding device is a bundle of optical fibers, disposed axially of the light receiver unit and having fibers of different length, the fibers having end portions extending transversely of said unit, spaced apart along the unit and disposed to receive emitted light; the photosensitive means comprising a cell mounted on an end of the bundle, for said exposure through the bundle.

* * * * *